US008267371B1

(12) United States Patent
Gilstad

(10) Patent No.: US 8,267,371 B1
(45) Date of Patent: Sep. 18, 2012

(54) IMPULSE TOLERANT VALVE BODY

(76) Inventor: Dennis W. Gilstad, San Antonio, TX (US)

( * ) Notice: Subject to any disclaimer, the term of this patent is extended or adjusted under 35 U.S.C. 154(b) by 0 days.

(21) Appl. No.: 13/196,916

(22) Filed: Aug. 3, 2011

(51) Int. Cl.
*F16K 31/44* (2006.01)
(52) U.S. Cl. .......... 251/80; 251/120; 251/332; 251/334; 251/367
(58) Field of Classification Search .................. 251/332, 251/356, 366–367, 12, 48, 77, 80, 120, 334; 137/516.29
See application file for complete search history.

(56) References Cited

U.S. PATENT DOCUMENTS

| 1,705,800 | A | * | 3/1929 | Akeyson | 251/332 |
| 2,298,632 | A | * | 10/1942 | Thorner | 251/319 |
| 2,446,196 | A | * | 8/1948 | Sitney | 137/340 |
| 2,682,891 | A | * | 7/1954 | Leslie | 137/625.36 |
| 2,851,243 | A | * | 9/1958 | Tannock | 251/332 |
| 3,433,250 | A | * | 3/1969 | Hagihara | 137/469 |
| 5,071,411 | A | * | 12/1991 | Hillstead | 604/246 |
| 5,979,242 | A | | 11/1999 | Hobbs | |
| 6,432,320 | B1 | | 8/2002 | Bonsignore et al. | |
| 7,222,837 | B1 | | 5/2007 | Blume | |
| 7,513,759 | B1 | | 4/2009 | Blume | |
| 7,847,057 | B2 | | 12/2010 | Muller et al. | |

\* cited by examiner

*Primary Examiner* — John K Fristoe, Jr.
*Assistant Examiner* — Marina Tietjen

(57) ABSTRACT

An impulse tolerant valve body has at least one internal variable-volume space capable of elastic longitudinal compression and rebound. Each such space is filled with incompressible fluid and has fluid communication with at least one internal surge chamber. A closing energy impulse due to valve closing causes elastic longitudinal compression of at least one variable-volume space, with consequent flow of incompressible fluid to at least one surge chamber via at least one fluid flow restrictor. During subsequent elastic rebound, incompressible fluid flows from at least one surge chamber to at least one variable-volume space, again via at least one fluid flow restrictor. A portion of valve closing impulse energy is thus redistributed as heat generated due to fluid friction losses and valve body hysteresis loss. Valve closing energy impulse amplitude is thereby reduced, impulse duration is increased, vibration spectrum is narrowed and induced resonance vibrations are damped.

9 Claims, 2 Drawing Sheets

IMPULSE TOLERANT VALVE BODY

FIELD OF THE INVENTION

The invention relates generally to reciprocating high-pressure pumps, and more specifically to the valves of such pumps.

BACKGROUND

Reciprocating high-pressure pumps, such as those for oil field use, are usually designed in two sections, the (proximal) power section (herein "power end") and the (distal) fluid section (herein "fluid end"). The power end comprises a crankshaft, reduction gears, bearings, connecting rods, crossheads, crosshead extension rods, etc. The fluid end comprises a housing which in turn comprises one or more functional units, each functional unit comprising a suction valve, a discharge valve, and a plunger or piston bore in which a reciprocating plunger or piston alternately produces suction strokes and pressure strokes. See, e.g., U.S. Pat. No. 7,513,759 B1, incorporated herein by reference.

Suction valves of high pressure oil field pumps experience wide pressure variations between a suction stroke, when the valve opens, and a pressure stroke, when the valve closes. For example, during a pressure stroke a valve body and seal assembly may be driven toward contact with its corresponding valve seat with total valve closing force that typically varies from about 50,000 to 150,000 pounds applied to the proximal surface of the valve body. Actual valve closure impact occurs with metal-to-metal contact between the valve body's valve seat interface and the valve seat itself. Such impact stops a conventional valve body abruptly, together with a proximal mass of moving pressurized fluid which is in contact with the valve body. The kinetic energy of the moving valve body and pressurized fluid is thus nearly instantly converted to a high-amplitude closing energy impulse of short duration. The sharply rising impulse of closing energy is quickly transmitted to the valve seat and adjacent areas of the pump housing in the form of characteristically broadband vibration which induces damaging resonances within the valve and adjacent pump housing structures. See, e.g., U.S. Pat. No. 5,979,242, incorporated herein by reference. Rapid valve wear and the early emergence of structurally significant fatigue cracks in the pump housing near the valve seat are commonly seen under these conditions.

Proposed designs which could alleviate a subset of the problems associated with high-amplitude closing energy impulses have included hollow (and thus lighter) valve bodies comprising one or a plurality of interior cavities. See, e.g., U.S. Pat. No. 7,222,837 B1, incorporated herein by reference, and referred to hereinafter as the '837 patent. Notwithstanding the somewhat lower closing energy impulse amplitudes theoretically associated with such valve bodies, they nevertheless have not found wide industry acceptance. A more effective valve body design for reducing pump damage due to closing energy impulse-related vibration is thus needed.

SUMMARY OF THE INVENTION

Since it contains at least one internal elastic variable-volume space filled with incompressible fluid, an impulse tolerant valve body of the invention is longitudinally compressible under a closing energy impulse as described above. During longitudinal compression (with fluid movement out of the space) and the elastic rebound which follows (with fluid movement into the space), a portion of the closing energy is redistributed as heat due to fluid friction losses and valve body hysteresis loss. Closing energy impulse amplitude is consequently reduced and impulse duration is increased. The closing energy impulse's characteristic vibration spectrum is thus narrowed, while induced resonance vibrations in the valve and associated pump structures are damped, thereby reducing the potential for pump damage.

Each internal variable-volume space of an impulse tolerant valve body of the invention is capable of elastic longitudinal compression (which reduces volume) and elastic rebound (which increases volume) under the influence of a brief closing energy impulse. And frictional energy loss in the form of heat (i.e., hysteresis loss) is associated with each compression-rebound cycle of a variable-volume space.

Further, each variable-volume space is filled with incompressible fluid and has fluid communication, directly and/or indirectly (as, for example, via another variable-volume space), with at least one constant-volume internal surge chamber. The term "fluid communication" refers to one or more internal channels through which an incompressible fluid may flow within a valve body of the invention. Incompressible fluid flow may be, for example, from a variable-volume space to a constant-volume surge chamber, or from one variable-volume space to another variable-volume space. And at least one of the internal channels through which incompressible fluid may flow comprises at least one fluid flow restrictor.

Each fluid flow restrictor causes an increase of turbulence in fluid flowing through the restrictor. Increased fluid turbulence, in turn, is associated with generation of frictional heat within the flowing fluid. This heat, which is eventually lost to the valve body generally and/or to the valve body surroundings (e.g., the pumped fluid), represents a reduction in the energy content of the closing energy impulse applied to the valve body.

Each compression-rebound cycle thus causes cyclical flow of incompressible fluid to and from at least one constant-volume surge chamber through at least one flow restrictor. At least a portion of space within each surge chamber is occupied by a compressible fluid (e.g., air) for accommodating the cyclical entry and exit of incompressible fluid.

During such cyclical flow of incompressible fluid at least a portion of the closing impulse energy is redistributed in the form of heat associated with fluid flow friction losses, adding to the heat released due to valve body hysteresis loss noted above. Closing energy impulse amplitude is thereby reduced and impulse duration is increased (proportional to incompressible fluid flow cycle times), with the resultant beneficial effects noted above. And the (localized) valve body heat is at least partly scavenged by the incompressible fluid for transfer to cooler portions of the valve body for eventual rejection to the valve body surroundings (e.g., the pumped fluid).

Note that fluid flow restrictors of the invention may be fixed or variable. If variable, the magnitude of fluid flow restriction may be a function of another variable, such as longitudinal compression. In such a case, the flow restriction is described herein as being responsive to longitudinal compression of the valve body. Fluid flow restriction may alternatively and/or additionally be manually adjustable according to predetermined criteria for optimizing valve performance.

The incompressible fluid thus absorbs and transports a first portion of closing impulse energy, which has been converted to heat via fluid friction (e.g., secondary to turbulence) in a fluid flow restrictor. The incompressible fluid also absorbs and transports a second portion of closing impulse energy, which has been converted to heat via hysteresis loss in the valve body. The incompressible fluid thus transports and redistributes these first and second portions of closing impulse energy, in the form of heat, to various portions of a valve body (and ultimately to the valve body's surroundings). To optimize heat transportation and redistribution by the incompressible fluid in particular operational environments, alteration of the incompressible fluid's parameters such as viscosity and/or thermal conductivity (e.g., by the addition of metallic nanoparticles to the fluid) may be employed.

Note that the term "incompressible fluid" herein includes relatively homogenous fluids (e.g., single-weight mineral oil or a single-species fluid polymer) as well as combination fluids containing one or more such relatively homogenous fluids plus finely divided particulate matter (e.g., nanoparticles) and/or other dispersed species (e.g., species in colloidal suspension). See, e.g., U.S. Pat. No. 6,432,320 B1, incorporated herein by reference and referred to hereinafter as the '320 patent.

Note also that the impulse tolerant characteristics of a valve body of the invention operate by three interacting mechanisms. First, impulse amplitude is reduced by converting a portion of total impulse energy to heat, which is then ultimately rejected to the valve body surroundings (e.g., the pumped fluid). Second, impulse duration at the valve seat is lengthened by the longitudinal compression and rebound cycle in the valve body (i.e., the incompressible fluid flow cycle time), with corresponding reduction of the impulse's characteristic bandwidth (and thus reduction of the damage potential) of induced vibrations. Third, induced vibration resonances of the valve body, valve seat, and/or pump housing structures are effectively damped by interactions within the valve body involving displacements of the incompressible fluid.

And note further that the flow of incompressible fluid during a compression and rebound cycle will assist in redistributing heat away from areas of the valve body which might otherwise develop hot spots due to relatively high fluid friction and/or hysteresis loss. Thus, the energy redistribution function of the impulse tolerant valve body of the invention assists in reducing thermal stress by reducing temperature differentials across the valve body.

To increase understanding of the invention, first, second and third embodiments are discussed herein only as illustrative examples. In a first invention embodiment, a valve body is symmetrical about a longitudinal axis and comprises at least one guide (e.g., a top guide stem), a proximal body portion, a distal body portion, at least one peripheral seal retention groove, a valve seat interface, at least one internal elastic variable-volume space responsive to longitudinal compression of the valve body, at least one internal constant-volume surge chamber, and at least one external access port (e.g., a proximal central tubular port and/or a distal central tubular port). At least one internal elastic variable-volume space is in fluid communication (directly and/or indirectly) with at least one internal constant-volume surge chamber via at least one fluid flow restrictor, at least one fluid flow restrictor being responsive to longitudinal compression of the valve body (e.g., a flow restrictor comprising longitudinally opposing proximal and distal circular bosses).

Further the above first invention embodiment has at least one internal variable-volume space that is responsive to longitudinal compression of the valve body. And each internal elastic variable-volume space is filled with incompressible fluid (e.g., mineral oil or a liquid polymer). The incompressible fluid may additionally comprise metallic nanoparticles comprising, for example, copper, beryllium, titanium, nickel, iron, alloys or blends thereof, and carbon. The term nanoparticle may conveniently be defined as including particles having an average size of up to about 2000 nm. See, e.g., the '320 patent.

In a second invention embodiment a valve body has a longitudinal axis, at least one guide, at least one peripheral seal retention groove, a valve seat interface, at least one internal elastic variable-volume space responsive to longitudinal compression of the valve body, at least one internal constant-volume space (i.e., not responsive to longitudinal compression of the valve body), an incompressible fluid filling each internal elastic variable-volume space, and at least one fluid flow restrictor to restrict flow of the incompressible fluid. Each such fluid flow restrictor may or may not be responsive to longitudinal compression of the valve body and, alternatively and/or additionally, each such fluid flow restrictor may or may not be manually adjustable. Further, at least one internal elastic variable-volume space is in fluid communication with at least one internal constant-volume space via at least one fluid flow restrictor.

The second invention embodiment's fluid may comprise, e.g., mineral oil, or a liquid polymer and may additionally comprise nanoparticles (e.g., metallic nanoparticles) to enhance heat transfer. Nanoparticles may comprise, for example, copper, beryllium, titanium, nickel, iron, alloys or blends thereof, and carbon. The term nanoparticle may conveniently be defined as including particles having an average size of up to about 2000 nm. See, e.g., the '320 patent.

A third invention embodiment is a method of making an impulse tolerant valve body. The method comprises providing a valve body having a longitudinal axis and comprising at least one guide, at least one peripheral seal retention groove, and a valve seat interface. The embodiment also provides within the valve body at least one elastic variable-volume space responsive to longitudinal compression of the valve body. Further the embodiment provides within the valve body at least one internal constant-volume surge chamber having fluid communication with each elastic variable-volume space, and at least one such fluid communication comprises at least one incompressible fluid flow restrictor. Finally, the embodiment provides an incompressible fluid to fill each elastic variable-volume space to make an impulse tolerant valve body. Note that in alternative embodiments, at least one fluid flow restrictor may be responsive to longitudinal compression of the valve body and, alternatively and/or additionally, each fluid flow restrictor may or may not be manually adjustable.

DETAILED DESCRIPTION

Figure 1:
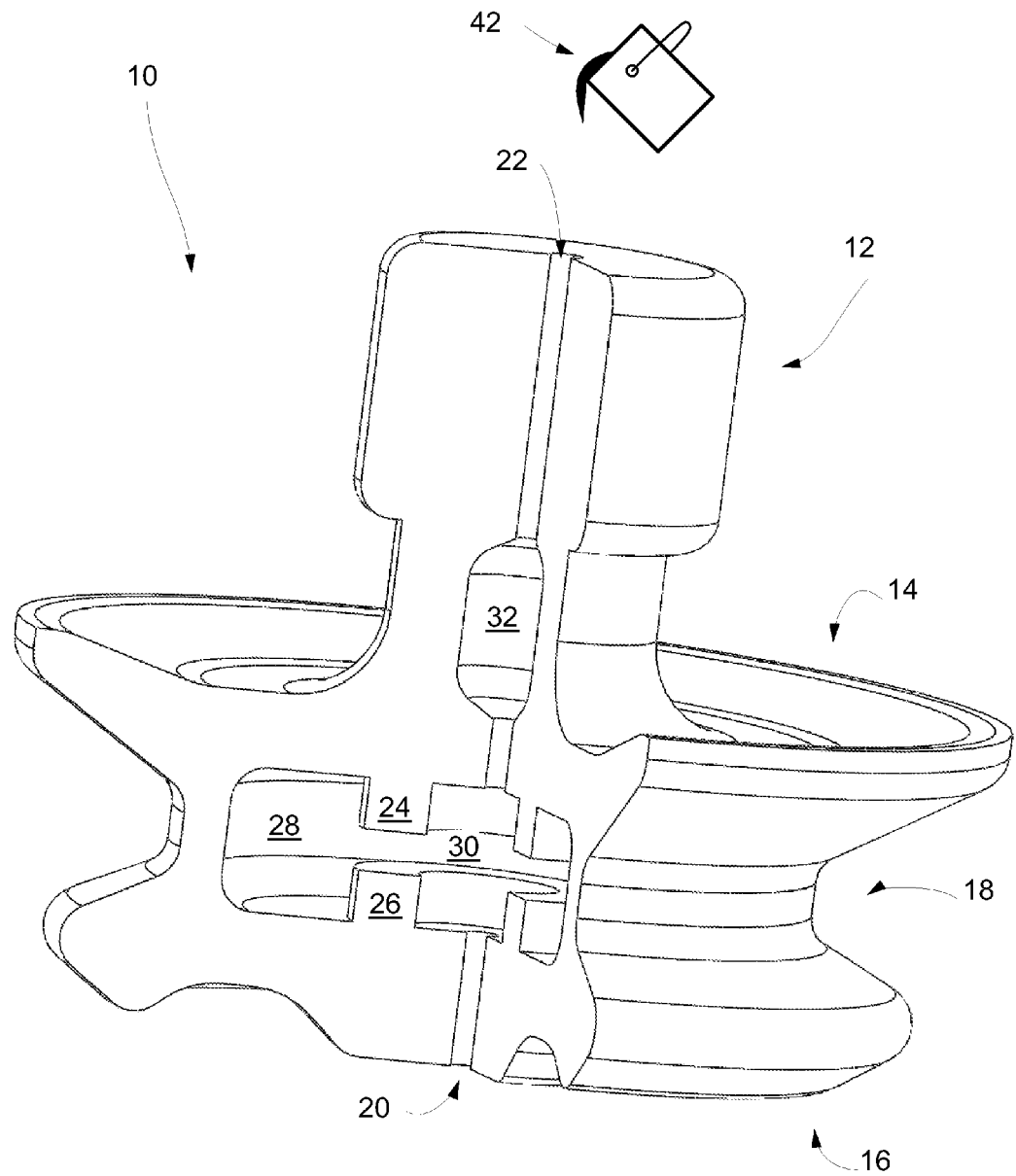
FIG. 1 is a 3-dimensional partial cross-sectional view of an invention embodiment in which a fluid flow restrictor comprises longitudinally opposing circular bosses, the flow restrictor thus being responsive to longitudinal compression of the valve body.
Figure 2:
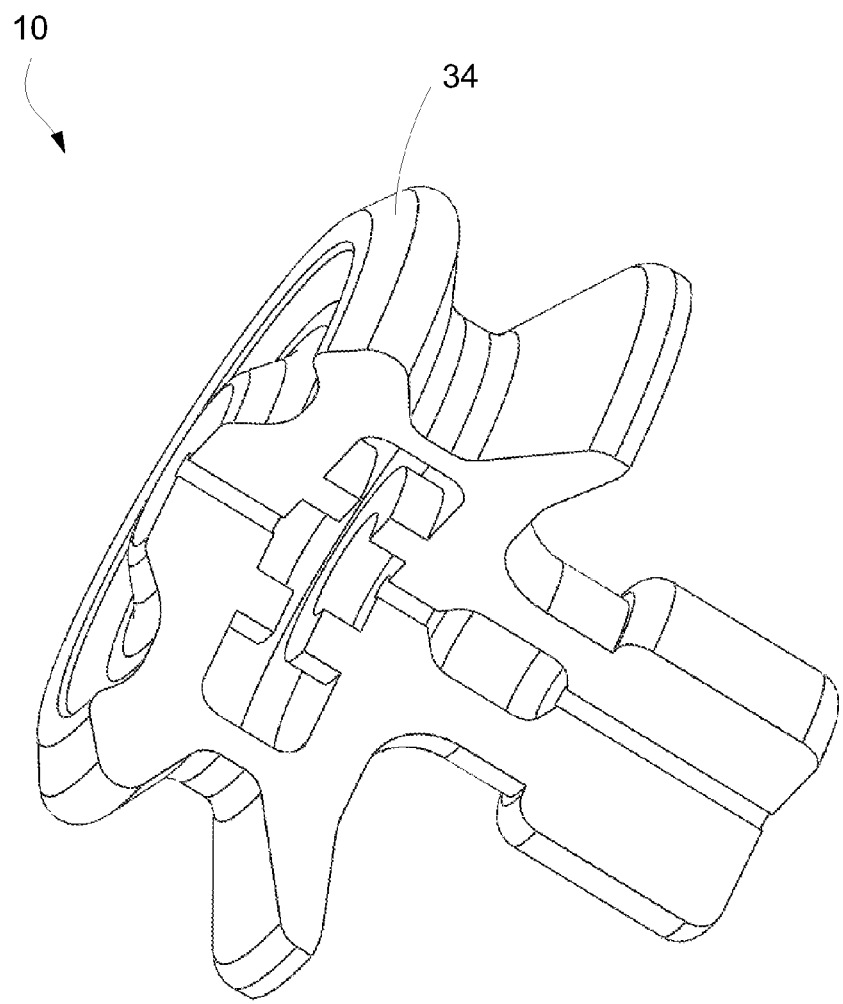
FIG. 2 is an inverted 3-dimensional partial cross-sectional view of the plunger seal ring schematically illustrated in FIG. 1, the view showing the valve seat interface feature more completely.

FIGS. 1 and 2 show different schematic views of an example valve body 10 of the invention, which is further described below. Note that an incompressible fluid 42 is schematically illustrated in FIG. 1 as being poured into valve body 10 via external access port 22 to avoid obscuring details of the internal structures of valve body 10 when the illustrated pouring operation is completed and internal elastic variable-volume spaces 28 and 30 are filled with incompressible fluid 42. Note also that incompressible fluid 42 may be introduced into valve body 10 via either external access port 20 or external access port 22 or both. Following the filling of elastic variable-volume spaces 28 and 30, ports 20 and 22 are plugged or sealed (e.g., by welding), thus ensuring that at least a portion of internal constant-volume surge chamber 32 is occupied by a compressible fluid (e.g., air) for accommodating the cyclical entry and exit of incompressible fluid moving between internal elastic variable-volume space 28 and/or 30 and internal constant-volume surge chamber 32.

In a first invention embodiment, a valve body 10 is symmetrical about a longitudinal axis and comprises at least one guide. The schematically illustrated example guide 12 is a top or proximal guide stem. Other guides (not illustrated) that may be incorporated in embodiments of the invention include, but are not limited to, a bottom or distal guide stem, a crowfoot guide, or a combination of top, bottom and/or crowfoot guides. Portions of a proximal (or top) body portion 14 and a distal (or bottom) body portion 16 form a peripheral seal retention groove 18. A valve seat interface 34 (seen more clearly in FIG. 2) is a portion of distal body portion 16. Internal elastic variable-volume spaces 28 and 30 each experience an elastic reduction in volume with longitudinal compression of valve body 10, with an elastic rebound (i.e., increase in volume) on removal of longitudinal compression of valve body 10. Internal elastic variable-volume spaces 28 and 30 are thus each characterized herein as responsive to longitudinal compression of valve body 10. Internal elastic variable-volume space 30 is shown in (direct) fluid communication with internal surge chamber 32, as well as external access port 22 (distal central tubular port). Internal elastic variable-volume space 28 is shown in (indirect) fluid communication with internal surge chamber 32 via fluid flow restrictors 24 and 26 (which are longitudinally opposed circular bosses) and internal elastic variable-volume space 30. As illustrated, fluid communication in embodiments of the invention may be direct and/or indirect.

Application or removal of longitudinal compression to valve body 10 will cause fluid flow restrictors 24 and 26 to alter restriction of incompressible fluid flow from or to internal elastic variable-volume space 28. Fluid flow restrictors 24 and 26 are thus each characterized herein as responsive to longitudinal compression of valve body 10.

Note that fluid flow restrictors 24 and 26 act in concert in the illustrated embodiment since they are longitudinally opposing proximal and distal circular bosses. A fluid flow restrictor in another embodiment of the invention may appear singly, and may or may not be responsive to longitudinal compression of the valve body with which it is associated. A flow restrictor which is responsive to longitudinal compression of the valve body with which it is associated facilitates adaptation of the valve body to varying pumped fluid pressures (i.e., increasing flow restriction with higher pumped fluid pressures and decreasing flow restriction with lower pumped fluid pressures).

The first embodiment's fluid 42 may comprise, e.g., mineral oil or liquid polymer to which may be added metallic nanoparticles which are generally invisible to the eye as they are typically dispersed in a colloidal suspension. Nanoparticles comprise, for example, copper, beryllium, titanium, nickel, iron, alloys or blends thereof, and carbon. The term nanoparticle may conveniently be defined as including particles having an average size of up to about 2000 nm.

In a second embodiment of the invention a valve body 10 has a longitudinal axis, at least one guide 12, at least one peripheral seal retention groove 18, a valve seat interface 34, at least one internal elastic variable-volume space 28 and/or 30 responsive to longitudinal compression of the valve body (see above descriptions of internal elastic variable-volumes 28 and 30), at least one internal constant-volume space 32 (i.e., a volume not responsive to longitudinal compression of the valve body). See above description of internal surge chamber 32. An incompressible fluid 42 is shown filling each internal elastic variable-volume 28 and 30, and at least one fluid flow restrictor (see fluid flow restrictors 24 and 26) is shown to restrict flow of incompressible fluid 42. In various invention embodiments, each fluid flow restrictor may or may not be responsive to longitudinal compression of the valve body. The illustrated fluid flow restrictors 24 and 26 are responsive to longitudinal compression of the valve body 10. At least one internal elastic variable-volume space 28 is shown to be in fluid communication with at least one internal constant-volume space 32 via at least one fluid flow restrictor (24 and 26).

The second embodiment's fluid 42 may comprise, e.g., mineral oil or fluid polymer to which may be added metallic nanoparticles comprising, for example, copper, beryllium, titanium, nickel, iron, alloys or blends thereof, and carbon. The term nanoparticle may conveniently be defined as including particles having an average size of up to about 2000 nm.

A third embodiment of the invention describes a method of making an impulse tolerant valve body 10. The method comprises providing a valve body 10 having a longitudinal axis and comprising at least one guide 12, at least one peripheral seal retention groove 18, and a valve seat interface 34. The embodiment also provides within valve body 10 at least one elastic variable-volume space responsive to longitudinal compression of the valve body (see above discussion of internal elastic variable-volumes 28 and 30). Further the embodiment provides within valve body 10 at least one internal constant-volume surge chamber 32 having fluid communication with each elastic variable-volume space 28 and 30, and at least one fluid communication comprises at least one fluid flow restrictor (see fluid flow restrictors 24 and 26). Finally, the embodiment provides incompressible fluid 42 to fill each elastic variable-volume space (see internal elastic variable-volumes 28 and 30) to make an impulse tolerant valve body. Note that in alternative embodiments, at least one fluid flow restrictor may be responsive to longitudinal compression of the valve body.

In addition to the first, second and third example embodiments described herein, still other alternative invention embodiments exist. For example, internal valve body spaces may be formed by welding (e.g., inertial welding or laser welding) valve body portions together as in the '837 patent, or by separately machining such spaces with separate coverings. Valve body fabrication may also be by rapid-prototyping (i.e., layer-wise) techniques. Such techniques may obviate the fluid-filling steps above by incorporating the fluid during fabrication. See, e.g., U.S. Pat. No. 7,847,057 B2, incorporated herein by reference Note also that the fluid used to fill the internal elastic variable-volume space(s) of an invention embodiment may be maintained (e.g., by temperature control) in a less viscous state during valve body filling, to be replaced by a more viscous state in a sealed valve body.

What is claimed is:

1. A valve body, symmetrical about a longitudinal axis and comprising at least one guide, a proximal body portion, a distal body portion, at least one peripheral seal retention groove, a valve seat interface, at least one internal elastic variable-volume space, at least one internal constant-volume surge chamber, and at least one external access port;
  wherein at least one said internal elastic variable-volume space is in fluid communication with at least one said internal constant-volume surge chamber via at least one fluid flow restrictor;
  wherein at least one said fluid flow restrictor is responsive to longitudinal compression of said valve body;
  wherein at least one said internal elastic variable-volume space is responsive to longitudinal compression of said valve body; and
  wherein each said internal elastic variable-volume space is filled with incompressible fluid.

2. The valve body of claim 1 wherein said incompressible fluid comprises mineral oil.

3. The valve body of claim 2 wherein said incompressible fluid additionally comprises nanoparticles.

4. The valve body of claim 3 wherein said nanoparticles comprise metallic nanoparticles having an average size of up to about 2000 nm.

5. The valve body of claim 1 wherein said at least one guide comprises a top guide stem.

6. The valve body of claim 1 wherein said at least one external access port comprises a proximal central tubular port and a distal central tubular port.

7. The valve body of claim 1 wherein at least one said fluid flow restrictor comprises longitudinally opposing proximal and distal circular bosses.

8. A valve comprising the valve body of claim 1.

9. A pump comprising at least one valve of claim 8.

* * * * *